United States Patent
Moiyallah, Jr. et al.

(10) Patent No.: US 10,313,441 B2
(45) Date of Patent: Jun. 4, 2019

(54) DATA PROCESSING SYSTEM WITH MACHINE LEARNING ENGINE TO PROVIDE ENTERPRISE MONITORING FUNCTIONS

(71) Applicant: Bank of America Corporation, Charlotte, NC (US)

(72) Inventors: Samuel Massa Moiyallah, Jr., Newark, DE (US); Joseph Benjamin Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 171 days.

(21) Appl. No.: 15/430,951

(22) Filed: Feb. 13, 2017

(65) Prior Publication Data
US 2018/0234325 A1  Aug. 16, 2018

(51) Int. Cl.
*H04L 12/26* (2006.01)
*H04L 29/08* (2006.01)
*G06N 20/00* (2019.01)

(52) U.S. Cl.
CPC ......... *H04L 67/1097* (2013.01); *G06N 20/00* (2019.01)

(58) Field of Classification Search
CPC . H04L 43/14; H04L 41/0869; H04L 67/1097; G06N 99/005
See application file for complete search history.

(56) References Cited

U.S. PATENT DOCUMENTS

| | | | |
|---|---|---|---|
| 8,539,080 B1 | 9/2013 | Uluderya et al. | |
| 9,015,320 B2 | 4/2015 | Rice et al. | |
| 9,185,006 B2 | 11/2015 | Uluderya et al. | |
| 9,300,577 B2 | 3/2016 | Uluderya et al. | |
| 9,311,066 B1* | 4/2016 | Garman | G06F 8/60 |
| 2006/0174238 A1* | 8/2006 | Henseler | G06F 8/63 |
| | | | 717/168 |
| 2007/0288791 A1* | 12/2007 | Allen | G06F 11/0709 |
| | | | 714/4.11 |
| 2014/0372513 A1* | 12/2014 | Jones | G06F 9/5072 |
| | | | 709/203 |

(Continued)

*Primary Examiner* — Oanh Duong
(74) *Attorney, Agent, or Firm* — Banner & Witcoff, Ltd.; Michael A. Springs

(57) ABSTRACT

Aspects of the disclosure relate to implementing and using a data processing system with a machine learning engine to provide enterprise monitoring functions. A computing platform may receive environment mapping data from a distributed computing environment. Subsequently, the computing platform may generate a machine learning dataset based on the environment mapping data. Then, the computing platform may validate the machine learning dataset and may monitor the distributed computing environment. Based on monitoring the distributed computing environment, the computing platform may detect an environmental modification in the distributed computing environment. After detecting the environmental modification in the distributed computing environment, the computing platform may receive updated environment mapping data from the distributed computing environment. Subsequently, the computing platform may generate an updated machine learning dataset based on the updated environment mapping data received from the distributed computing environment.

18 Claims, 12 Drawing Sheets

(56) References Cited

U.S. PATENT DOCUMENTS

| | | | |
|---|---|---|---|
| 2015/0172321 A1* | 6/2015 | Kirti | H04L 63/20 726/1 |
| 2015/0319185 A1* | 11/2015 | Kirti | H04L 63/1416 726/23 |
| 2016/0055044 A1* | 2/2016 | Kawai | G06N 99/005 714/26 |
| 2016/0246960 A1* | 8/2016 | Chauvet | G06F 21/52 |
| 2017/0012870 A1 | 1/2017 | Blair et al. | |
| 2017/0012907 A1 | 1/2017 | Smullen et al. | |
| 2017/0012988 A1 | 1/2017 | Turgeman et al. | |
| 2017/0013127 A1 | 1/2017 | Xue et al. | |
| 2017/0013131 A1 | 1/2017 | Craib | |
| 2017/0013132 A1 | 1/2017 | Ristock et al. | |
| 2017/0013417 A1 | 1/2017 | Zampini, II | |
| 2017/0017251 A1 | 1/2017 | Forbes, Jr. | |
| 2017/0017368 A1 | 1/2017 | Maheshwari et al. | |
| 2017/0017932 A1 | 1/2017 | Kodeswaran et al. | |
| 2017/0017935 A1 | 1/2017 | Beaudoin | |
| 2017/0018102 A1 | 1/2017 | Cardno | |
| 2017/0019379 A1 | 1/2017 | Galinski et al. | |
| 2017/0019487 A1 | 1/2017 | Maheshwari et al. | |
| 2017/0019496 A1 | 1/2017 | Orbach | |
| 2017/0019750 A1 | 1/2017 | Palanisamy et al. | |
| 2017/0024312 A1 | 1/2017 | Salame | |
| 2017/0024449 A1 | 1/2017 | Wesley, Sr. et al. | |
| 2017/0024653 A1 | 1/2017 | Deshmukh et al. | |
| 2017/0024656 A1 | 1/2017 | Gilon et al. | |
| 2017/0024912 A1 | 1/2017 | de Castro Alves et al. | |
| 2017/0024951 A1 | 1/2017 | Nelson et al. | |
| 2017/0025040 A1 | 1/2017 | Maturana et al. | |
| 2017/0025860 A1 | 1/2017 | Forbes, Jr. | |
| 2017/0026119 A1 | 1/2017 | Raj et al. | |
| 2017/0026383 A1 | 1/2017 | Hayton et al. | |
| 2017/0026509 A1 | 1/2017 | Rand | |
| 2017/0026514 A1 | 1/2017 | Dwyer et al. | |
| 2017/0030349 A1 | 2/2017 | Bassett et al. | |
| 2017/0031565 A1 | 2/2017 | Chauhan et al. | |
| 2017/0031659 A1 | 2/2017 | Burke et al. | |
| 2017/0032268 A1* | 2/2017 | Rajagopalan | G06N 7/005 |
| 2017/0032436 A1 | 2/2017 | DiSalvo et al. | |
| 2017/0032459 A1 | 2/2017 | Kaminski et al. | |
| 2017/0034001 A1 | 2/2017 | Dagan | |
| 2017/0034012 A1 | 2/2017 | Douglas et al. | |
| 2017/0034014 A1 | 2/2017 | Bingham et al. | |
| 2017/0034023 A1 | 2/2017 | Nickolov et al. | |
| 2017/0034192 A1 | 2/2017 | Schulman et al. | |
| 2017/0034193 A1 | 2/2017 | Schulman et al. | |
| 2017/0034196 A1 | 2/2017 | Chauhan et al. | |
| 2017/0034209 A1 | 2/2017 | Bhogavilli et al. | |
| 2017/0034361 A1 | 2/2017 | Baldwin et al. | |
| 2017/0038981 A1 | 2/2017 | Karamcheti et al. | |
| 2017/0039500 A1 | 2/2017 | Leidner et al. | |
| 2017/0039784 A1 | 2/2017 | Gelbart et al. | |
| 2017/0041070 A1 | 2/2017 | Ryan et al. | |
| 2017/0041071 A1 | 2/2017 | Ryan et al. | |
| 2017/0041296 A1 | 2/2017 | Ford et al. | |
| 2017/0041454 A1 | 2/2017 | Nicholls et al. | |
| 2017/0316204 A1* | 11/2017 | Thakur | G06F 21/554 |
| 2017/0322731 A1* | 11/2017 | Lee | G06F 12/0246 |
| 2017/0364561 A1* | 12/2017 | Wu | G06F 17/30498 |
| 2018/0018599 A1* | 1/2018 | Jensen | G06Q 10/06 |
| 2018/0067778 A1* | 3/2018 | Hawilo | G06F 9/5033 |
| 2018/0069934 A1* | 3/2018 | Jurgenson | H04W 4/029 |

* cited by examiner

DATA PROCESSING SYSTEM WITH MACHINE LEARNING ENGINE TO PROVIDE ENTERPRISE MONITORING FUNCTIONS

BACKGROUND

Aspects of the disclosure relate to electrical computers, data processing systems, and machine learning. In particular, one or more aspects of the disclosure relate to implementing and using a data processing system with a machine learning engine to provide enterprise monitoring functions.

Large enterprise organizations may deploy, operate, maintain, and use many different computer systems, which may provide many different services to various affiliated entities associated with a given computing environment. As new computer systems and services are introduced and the technical complexity of such a computing environment grows, it may become increasingly difficult for network administrators, organization employees, and other affiliated entities to optimize, maintain, monitor, and/or otherwise utilize such computer systems and services, particularly in instances in which a technical issue arises in a particular application or system that is part of a larger enterprise computing infrastructure.

SUMMARY

Aspects of the disclosure provide effective, efficient, scalable, and convenient technical solutions that address and overcome the technical problems associated with optimizing, maintaining, and utilizing computer systems and services. In particular, one or more aspects of the disclosure provide techniques for implementing and using a data processing system with a machine learning engine to provide enterprise monitoring functions.

In accordance with one or more embodiments, a computing platform having at least one processor, a memory, and a communication interface may receive, via the communication interface, environment mapping data from a distributed computing environment. Subsequently, the computing platform may generate a machine learning dataset based on the environment mapping data received from the distributed computing environment. Then, the computing platform may validate the machine learning dataset generated based on the environment mapping data received from the distributed computing environment. Thereafter, the computing platform may monitor the distributed computing environment. Based on monitoring the distributed computing environment, the computing platform may detect an environmental modification in the distributed computing environment. After detecting the environmental modification in the distributed computing environment, the computing platform may receive, via the communication interface, updated environment mapping data from the distributed computing environment. Subsequently, the computing platform may generate an updated machine learning dataset based on the updated environment mapping data received from the distributed computing environment.

In some embodiments, receiving the environment mapping data from the distributed computing environment may include receiving a first portion of the environment mapping data from one or more enterprise servers located in at least one data center associated with the distributed computing environment and receiving a second portion of the environment mapping data from one or more cloud servers associated with the distributed computing environment.

In some embodiments, generating the machine learning dataset based on the environment mapping data received from the distributed computing environment may include identifying one or more servers, switches, and other hardware elements included in the distributed computing environment and identifying one or more applications, libraries, and other software elements included in the distributed computing environment. In some instances, identifying the one or more servers, switches, and other hardware elements included in the distributed computing environment may include tracking at least one hardware-software transaction flow using one or more trace identifiers.

In some embodiments, detecting the environmental modification in the distributed computing environment may include detecting one or more new hardware elements in the distributed computing environment. In some embodiments, detecting the environmental modification in the distributed computing environment may include detecting one or more new software elements in the distributed computing environment.

In some embodiments, validating the machine learning dataset generated based on the environment mapping data received from the distributed computing environment may include validating the machine learning dataset based on input received from one or more user computing devices.

In some embodiments, prior to receiving the environment mapping data from the distributed computing environment, the computing platform may generate one or more environment scan commands directing one or more hardware elements included in the distributed computing environment to provide mapping data. Subsequently, the computing platform may send, via the communication interface, to the distributed computing environment, the one or more environment scan commands directing the one or more hardware elements included in the distributed computing environment to provide the mapping data.

In some embodiments, in response to detecting the environmental modification in the distributed computing environment, the computing platform may generate one or more updated environment scan commands directing one or more hardware elements included in the distributed computing environment to provide mapping data. Subsequently, the computing platform may send, via the communication interface, to the distributed computing environment, the one or more updated environment scan commands directing the one or more hardware elements included in the distributed computing environment to provide the mapping data.

In some embodiments, the computing platform may validate the updated machine learning dataset generated based on the updated environment mapping data received from the distributed computing environment.

In some embodiments, the computing platform may monitor one or more activities in the distributed computing environment. Based on monitoring the one or more activities in the distributed computing environment, the computing platform may generate at least one activity issue notification. Subsequently, the computing platform may send, via the communication interface, to at least one user device, the at least one activity issue notification generated based on monitoring the one or more activities in the distributed computing environment. In some instances, the at least one activity issue notification generated based on monitoring the one or more activities in the distributed computing environment may include an indication that a workload level of at least one hardware element included in the distributed computing environment exceeds a predetermined threshold. In some instances, the at least one activity issue notification generated based on monitoring the one or more activities in the distributed computing environment may include an indication that a technical issue encountered by at least one hardware element included in the distributed computing environment results from at least one root cause determined by the computing platform based on the updated machine learning dataset.

In some embodiments, the computing platform may receive, via the communication interface, from at least one user device, information identifying one or more proposed changes to one or more hardware elements included in the distributed computing environment or one or more software elements included in the distributed computing environment. In response to receiving the information identifying the one or more proposed changes to the one or more hardware elements included in the distributed computing environment or the one or more software elements included in the distributed computing environment, the computing platform may generate, based on the updated machine learning dataset, a listing of one or more predicted issues arising from the one or more proposed changes to the one or more hardware elements included in the distributed computing environment or the one or more software elements included in the distributed computing environment. Subsequently, the computing platform may generate a notification for the at least one user device, and the notification may include the listing of the one or more predicted issues arising from the one or more proposed changes to the one or more hardware elements included in the distributed computing environment or the one or more software elements included in the distributed computing environment. Then, the computing platform may send, via the communication interface, to the at least one user device, the notification generated for the at least one user device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to using machine learning to provide enterprise monitoring functions. In some instances, an enterprise monitoring computing platform may learn an environment and build neural network relationships between production entities. The enterprise monitoring computing platform may detect operating system and/or software compatibility conflicts (e.g., based on versioning), learn anomaly patterns, and/or prevent reoccurrence(s). In some instances, the enterprise monitoring computing platform may predict and detect capacity, system resources, memory leaks, and perform intelligent on-demand routing based on overall knowledge (e.g., cognitive awareness) of the entire enterprise-wide system (e.g., in an end-to-end manner). In some instances, the enterprise monitoring computing platform may provide enterprise on demand routing (e.g., based on and/or in response to detecting peak hours, downstream failures, hung Java virtual machine (JVM) instances, hung server instances, and/or the like). Additionally or alternatively, the enterprise monitoring computing platform may pin-point root-cause in a heterogeneous distributed environment (e.g., in an end-to-end manner) and/or may provide non-customized dynamic and/or real-time transaction tracing, as illustrated in greater detail below.

Figure 1A:
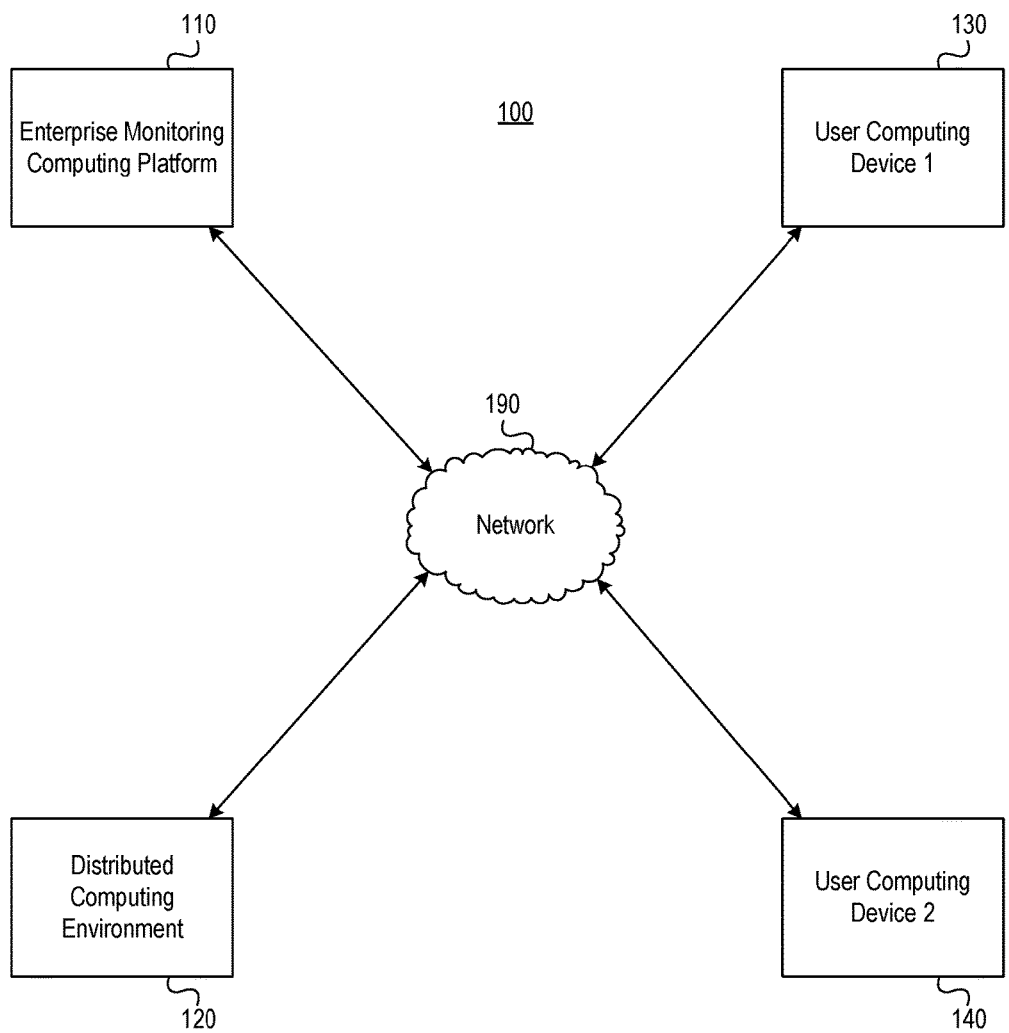
FIGS. 1A, 1B, and 1C depict an illustrative computing environment for implementing and using a data processing system with a machine learning engine to provide enterprise monitoring functions in accordance with one or more example embodiments.
Figure 1B:
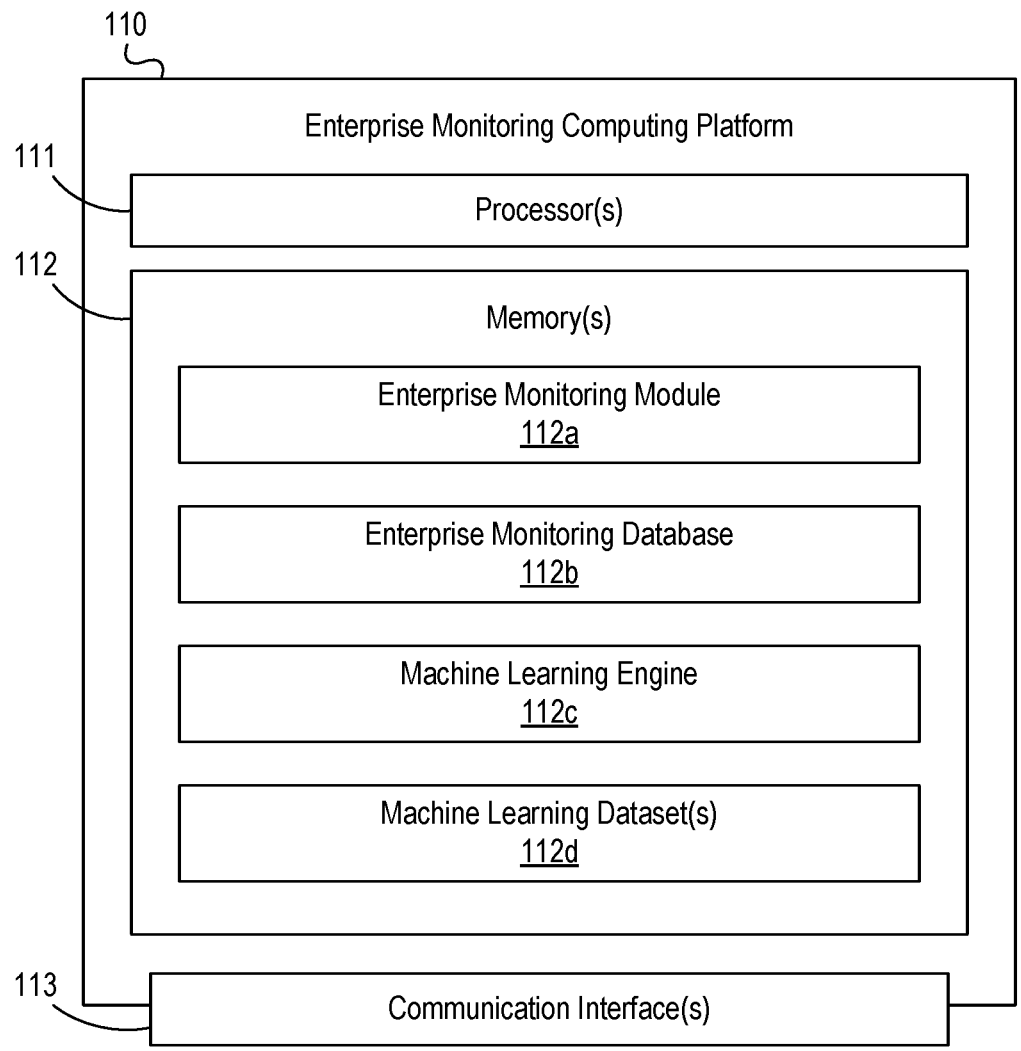
Figure 1C:
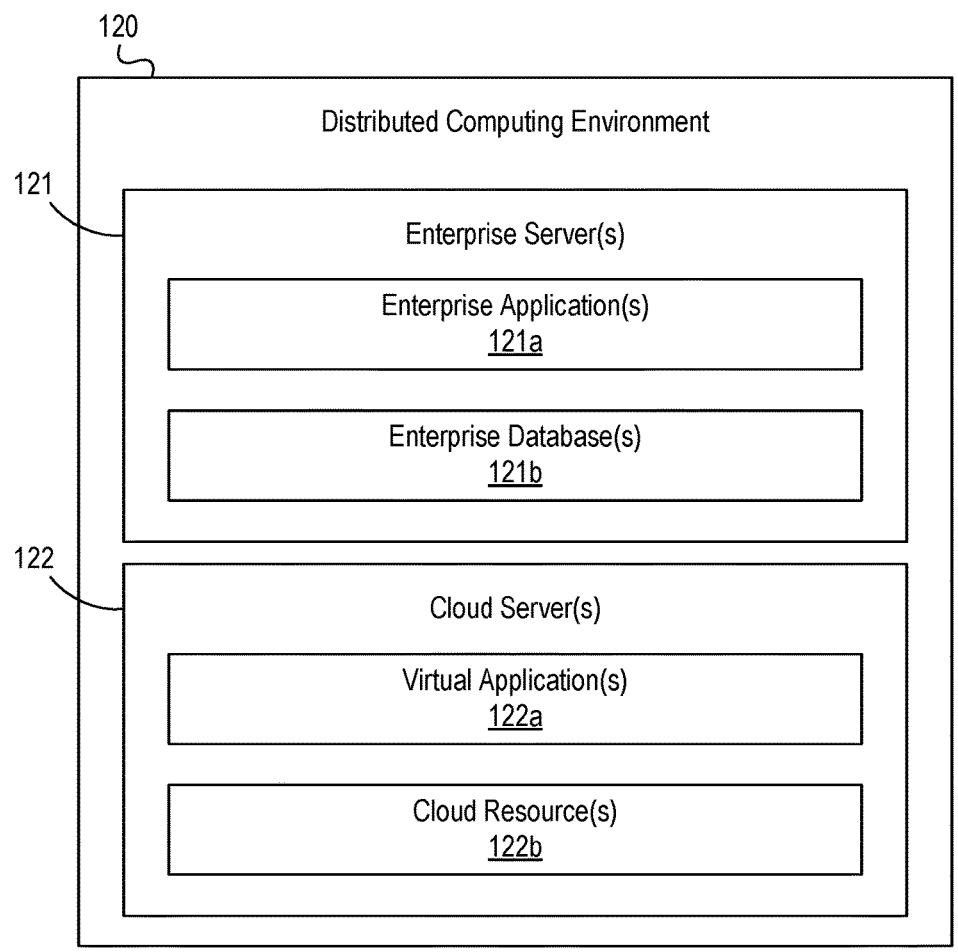

FIGS. 1A, 1B, and 1C depict an illustrative computing environment for implementing and using a data processing system with a machine learning engine to provide enterprise monitoring functions in accordance with one or more example embodiments. Referring to FIG. 1A, computing environment 100 may include one or more computing devices and/or other computer systems. For example, computing environment 100 may include an enterprise monitoring computing platform 110, a distributing computing environment 120, a first user computing device 130, and a second user computing device 140.

Enterprise monitoring computing platform 110 may be configured to host and/or execute a machine learning engine to provide enterprise monitoring functions, as discussed in greater detail below. Distributing computing environment 120 may include one or more hardware elements and/or one or more software elements, which may support operations of an enterprise organization, for instance, as discussed in greater detail below. User computing device 130 and user computing device 140 may be used by one or more network administrators and/or other users to interact with enterprise monitoring computing platform 110, distributing computing environment 120, and/or one or more other computer systems and/or devices.

In one or more arrangements, enterprise monitoring computing platform 110, user computing device 130, user computing device 140, and one or more systems and/or devices included in distributing computing environment 120 may be any type of computing device capable of receiving a user interface, receiving input via the user interface, and communicating the received input to one or more other computing devices. For example, enterprise monitoring computing platform 110, user computing device 130, user computing device 140, and one or more systems and/or devices included in distributing computing environment 120 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise monitoring computing platform 110, user computing device 130, user computing device 140, and one or more systems and/or devices included in distributing computing environment 120 may, in some instances, be special-purpose computing devices configured to perform specific functions.

Computing environment 100 also may include one or more computing platforms. For example, and as noted above, computing environment 100 may include enterprise monitoring computing platform 110. As illustrated in greater detail below, enterprise monitoring computing platform 110 may include one or more computing devices configured to perform one or more of the functions described herein. For example, enterprise monitoring computing platform 110 may include one or more computers (e.g., laptop computers, desktop computers, servers, server blades, or the like). Computing environment 100 also may include one or more networks, which may interconnect one or more of enterprise monitoring computing platform 110, distributing computing environment 120, user computing device 130, and user computing device 140. For example, computing environment 100 may include network 190, which may include one or more public networks, private networks, and/or sub-networks (e.g., local area networks (LANs), wide area networks (WANs), or the like).

Referring to FIG. 1B, enterprise monitoring computing platform 110 may include one or more processors 111, memory(s) 112, and communication interface(s) 113. A data bus may interconnect processor(s) 111, memory(s) 112, and communication interface(s) 113. Communication interface 113 may be and/or include one or more network interfaces configured to support communication between enterprise monitoring computing platform 110 and one or more networks (e.g., network 190). Memory 112 may be and/or include one or more memory units that include one or more program modules having instructions that when executed by processor(s) 111 cause enterprise monitoring computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of enterprise monitoring computing platform 110 and/or by different computing devices that may form and/or otherwise make up enterprise monitoring computing platform 110. For example, memory 112 may have, store, and/or include an enterprise monitoring module 112a, an enterprise monitoring database 112b, a machine learning engine 112c, and one or more machine learning datasets 112d. Enterprise monitoring module 112a and enterprise monitoring database 112b may store instructions and/or data that cause and/or enable enterprise monitoring computing platform 110 to provide one or more enterprise monitoring functions and/or perform other functions. Machine learning engine 112c and the one or more machine learning datasets 112d may store instructions and/or include data that cause and/or enable enterprise monitoring computing platform 110 to provide one or more machine learning functions and/or associated services.

Referring to FIG. 1C, distributing computing environment 120 may include one or more enterprise servers 121 and one or more cloud servers 122. The one or more enterprise servers 121 may include one or more physical server computing devices that may, for instance, be located in one or more data centers (which may, e.g., be owned, operated, and/or maintained by an organization operating enterprise monitoring computing platform 110, such as a financial institution). In addition, the one or more enterprise servers 121 may store, execute, and/or host one or more enterprise applications 121a (which may, e.g., include one or more online banking applications, mobile banking applications, loan processing applications, online bill pay applications, and/or other applications that may be used and/or provided by an organization operating enterprise monitoring computing platform 110, such as a financial institution) and enterprise databases 121b (which may, e.g., include one or more account history databases, transaction history databases, device history databases, and/or other databases that may be used and/or provided by an organization operating enterprise monitoring computing platform 110, such as a financial institution). The one or more cloud servers 122 may include one or more remote and/or virtual servers (which may, e.g., be hosted on one or more remote computing devices and/or other remote physical infrastructure different from physical infrastructure that may be owned, operated, and/or maintained by an organization operating enterprise monitoring computing platform 110, such as a financial institution). In addition, the one or more cloud servers 122 may store, execute, and/or host one or more virtual applications 122a (which may, e.g., include one or more remote and/or virtualized online banking applications, mobile banking applications, loan processing applications, online bill pay applications, and/or other virtualized applications that may be used and/or provided by an organization operating enterprise monitoring computing platform 110, such as a financial institution) and one or more cloud resources 122b (which may, e.g., be used for remote storage and/or replication of one or more account history databases, transaction history databases, device history databases, and/or other databases that may be used and/or provided by an organization operating enterprise monitoring computing platform 110, such as a financial institution).

Figure 2A:
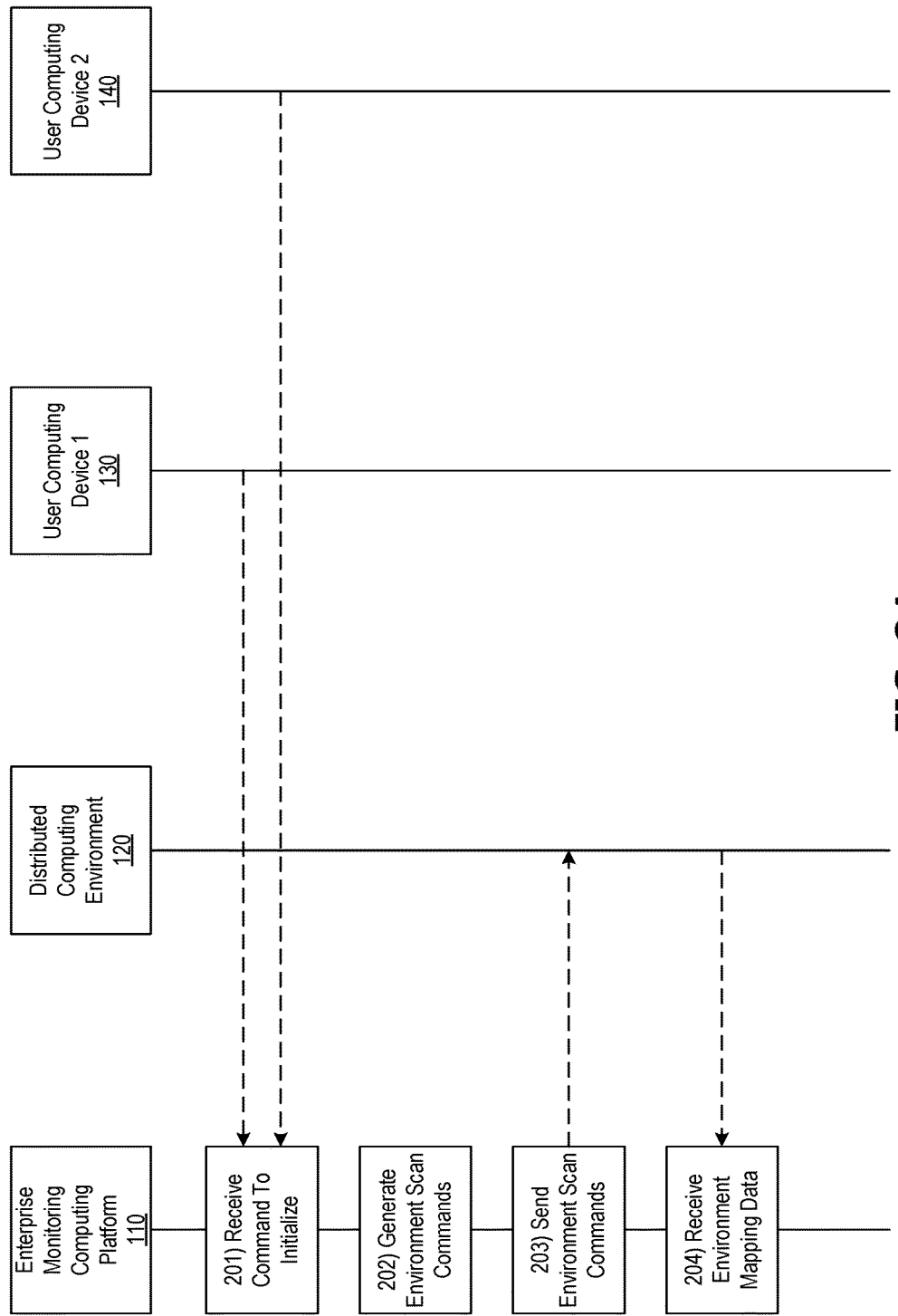
FIGS. 2A-2F depict an illustrative event sequence for implementing and using a data processing system with a machine learning engine to provide enterprise monitoring functions in accordance with one or more example embodiments.

FIGS. 2A-2F depict an illustrative event sequence for implementing and using a data processing system with a machine learning engine to provide enterprise monitoring functions in accordance with one or more example embodiments. Referring to FIG. 2A, at step 201, enterprise monitoring computing platform 110 may receive one or more commands to initialize (e.g., from user computing device 130, user computing device 140, and/or one or more other systems and/or devices).

At step 202, enterprise monitoring computing platform 110 may generate one or more environment scan commands (e.g., to perform an initial environment mapping). For example, at step 202, enterprise monitoring computing platform 110 may generate one or more environment scan commands directing one or more hardware elements included in a distributed computing environment (e.g., distributing computing environment 120) to provide mapping data. At step 203, enterprise monitoring computing platform 110 may send the one or more environment scan commands to distributing computing environment 120. For example, at step 203, enterprise monitoring computing platform 110 may send, via a communication interface (e.g., communication interface 113), to the distributed computing environment (e.g., distributing computing environment 120), the one or more environment scan commands directing the one or more hardware elements included in the distributed computing environment (e.g., distributing computing environment 120) to provide mapping data.

At step 204, enterprise monitoring computing platform 110 may receive environment mapping data from distributing computing environment 120. For example, at step 204, enterprise monitoring computing platform 110 may receive, via the communication interface (e.g., communication interface 113), environment mapping data from the distributed computing environment (e.g., distributing computing environment 120). In some embodiments, receiving the environment mapping data from the distributed computing environment may include receiving a first portion of the environment mapping data from one or more enterprise servers located in at least one data center associated with the distributed computing environment and receiving a second portion of the environment mapping data from one or more cloud servers associated with the distributed computing environment. For example, in receiving the environment mapping data from the distributed computing environment (e.g., distributing computing environment 120), enterprise monitoring computing platform 110 may receive a first portion of the environment mapping data from one or more enterprise servers (e.g., one or more enterprise servers 121) located in at least one data center associated with the distributed computing environment (e.g., distributing computing environment 120) and receiving a second portion of the environment mapping data from one or more cloud servers (e.g., one or more cloud servers 122) associated with the distributed computing environment (e.g., distributing computing environment 120).

Figure 2B:
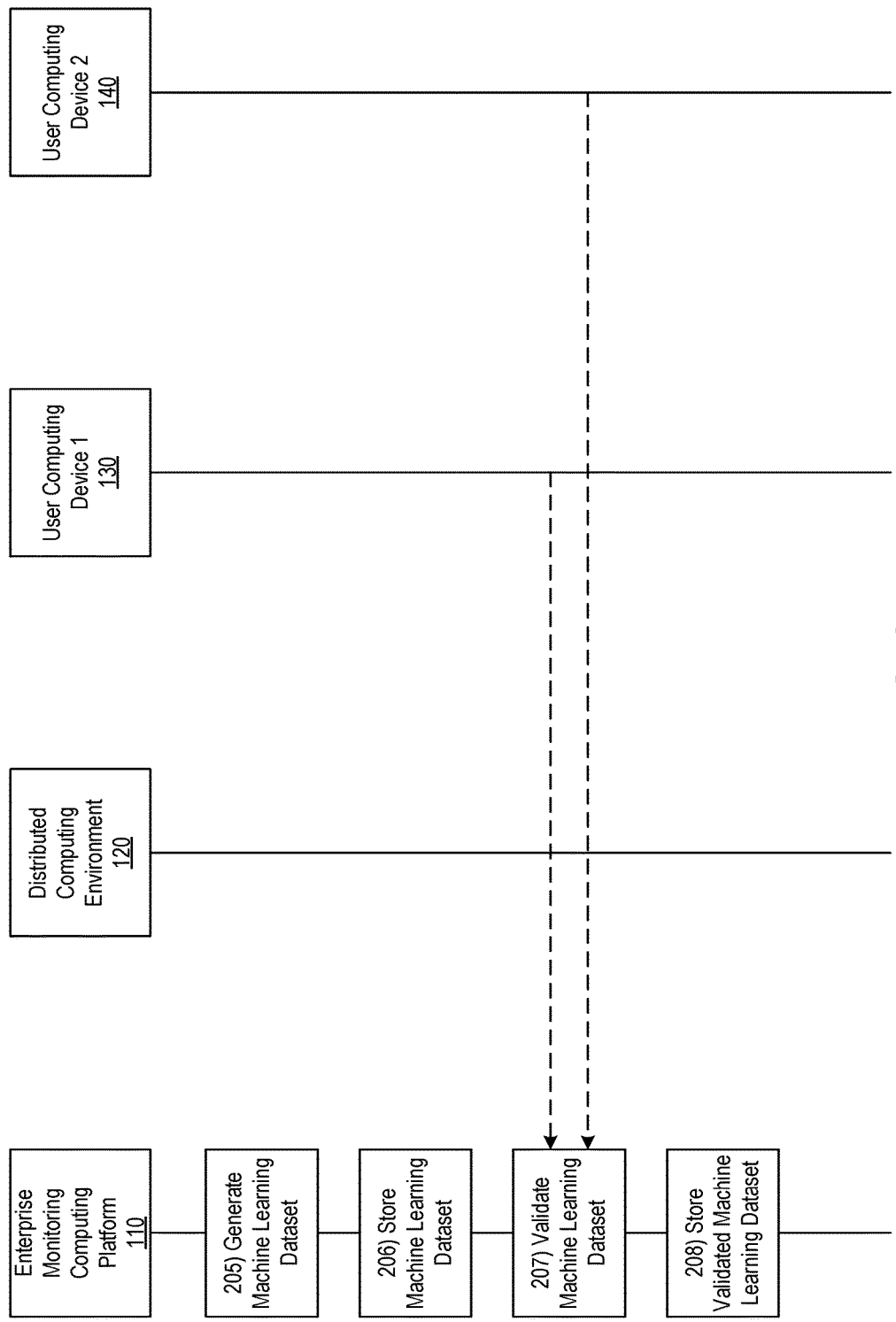

Referring to FIG. 2B, at step 205, enterprise monitoring computing platform 110 may generate a machine learning dataset based on the environment mapping data (e.g., to create a training dataset or other initial machine learning dataset based on the mapping). For example, at step 205, enterprise monitoring computing platform 110 may generate a machine learning dataset based on the environment mapping data received from the distributed computing environment (e.g., distributing computing environment 120).

In some embodiments, generating the machine learning dataset based on the environment mapping data received from the distributed computing environment may include identifying one or more servers, switches, and other hardware elements included in the distributed computing environment and identifying one or more applications, libraries, and other software elements included in the distributed computing environment. For example, in generating the machine learning dataset based on the environment mapping data received from the distributed computing environment (e.g., distributing computing environment 120), enterprise monitoring computing platform 110 may identify one or more servers, switches, and other hardware elements included in the distributed computing environment (e.g., distributing computing environment 120) and may identify one or more applications, libraries, and other software elements included in the distributed computing environment (e.g., distributing computing environment 120). Any and/or all of this information may be inserted into the machine learning dataset by enterprise monitoring computing platform 110 and/or otherwise included in the machine learning dataset, which may be used in enterprise monitoring computing platform 110 in monitoring distributing computing environment 120, in identifying actual and/or potential technical issues in distributing computing environment 120, and/or in performing other functions, as illustrated in greater detail below.

In some instances, identifying the one or more servers, switches, and other hardware elements included in the distributed computing environment may include tracking at least one hardware-software transaction flow using one or more trace identifiers. For example, in identifying the one or more servers, switches, and other hardware elements included in the distributed computing environment (e.g., distributing computing environment 120), enterprise monitoring computing platform 110 may track at least one hardware-software transaction flow using one or more trace identifiers. Such trace identifiers may, for instance, be and/or include unique identifiers that enterprise monitoring computing platform 110 can recognize as they pass through various hardware elements (e.g., network switches) and/or software elements (e.g., API (application programming interface) calls) in distributing computing environment 120 during such a hardware-software transaction flow.

At step 206, enterprise monitoring computing platform 110 may store the machine learning dataset. For example, at step 206, enterprise monitoring computing platform 110 may store the machine learning dataset generated at step 205. At step 207, enterprise monitoring computing platform 110 may validate the machine learning dataset (e.g., to validate the initial mapping of the environment, so as to refine the machine learning dataset). For example, at step 207, enterprise monitoring computing platform 110 may validate the machine learning dataset generated based on the environment mapping data received from the distributed computing environment (e.g., distributing computing environment 120). In some embodiments, validating the machine learning dataset generated based on the environment mapping data received from the distributed computing environment may include validating the machine learning dataset based on input received from one or more user computing devices. For example, in validating the machine learning dataset generated based on the environment mapping data received from the distributed computing environment (e.g., distributing computing environment 120), enterprise monitoring computing platform 110 may validate the machine learning dataset based on input received from one or more user computing devices (e.g., user computing device 130, user computing device 140). At step 208, enterprise monitoring computing platform 110 may store the validated machine learning dataset.

Figure 2C:
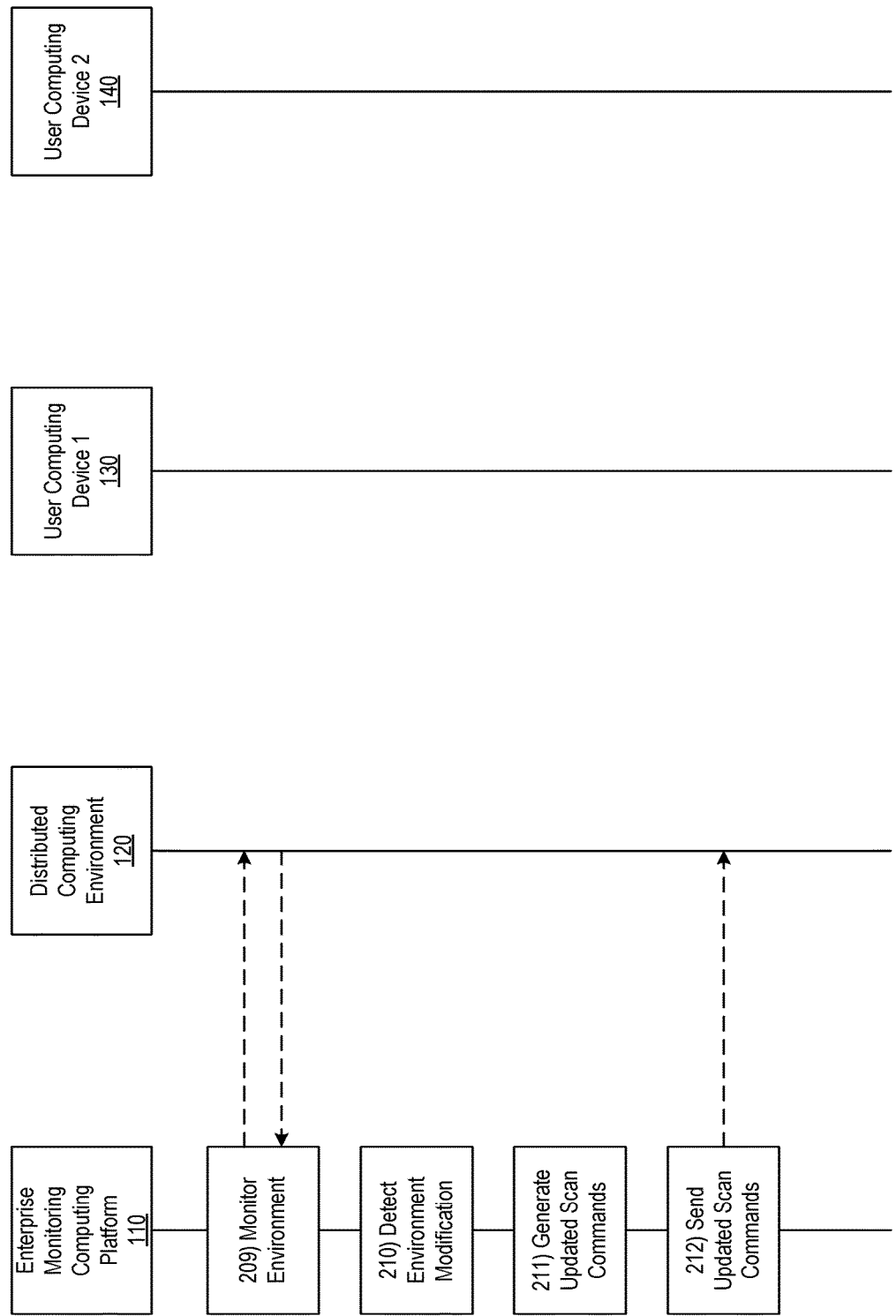

Referring to FIG. 2C, at step 209, enterprise monitoring computing platform 110 may monitor distributing computing environment 120 (e.g., by continuously listening to and/or receiving information associated with hardware and/or software in distributing computing environment 120). For example, at step 209, enterprise monitoring computing platform 110 may monitor the distributed computing environment (e.g., distributing computing environment 120). At step 210, enterprise monitoring computing platform 110 may detect an environment modification (e.g., based on the monitoring performed at step 209). For example, at step 210, based on monitoring the distributed computing environment (e.g., distributing computing environment 120), enterprise monitoring computing platform 110 may detect an environmental modification in the distributed computing environment (e.g., distributing computing environment 120).

In some embodiments, detecting the environmental modification in the distributed computing environment may include detecting one or more new hardware elements in the distributed computing environment. For example, in detecting the environmental modification in the distributed computing environment (e.g., distributing computing environment 120), enterprise monitoring computing platform 110 may detect one or more new hardware elements in the distributed computing environment (e.g., distributing computing environment 120). Such new hardware elements may, for instance, have been added as a result of system maintenance and/or manual upgrades to hardware included in distributing computing environment 120.

In some embodiments, detecting the environmental modification in the distributed computing environment may include detecting one or more new software elements in the distributed computing environment. For example, in detecting the environmental modification in the distributed computing environment (e.g., distributing computing environment 120), enterprise monitoring computing platform 110 may detect one or more new software elements in the distributed computing environment (e.g., distributing computing environment 120). Such new software elements may, for instance, have been added as a result of system maintenance and/or manual upgrades to software included distributing computing environment 120.

At step 211, enterprise monitoring computing platform 110 may generate one or more updated scan commands. For example, at step 211, in response to detecting the environmental modification in the distributed computing environment (e.g., distributing computing environment 120), enterprise monitoring computing platform 110 may generate one or more updated environment scan commands directing one or more hardware elements included in the distributed computing environment (e.g., distributing computing environment 120) to provide mapping data. At step 212, enterprise monitoring computing platform 110 may send the one or more updated scan commands to distributing computing environment 120. For example, at step 212, enterprise monitoring computing platform 110 may send, via the communication interface (e.g., communication interface 113), to the distributed computing environment (e.g., distributing computing environment 120), the one or more updated environment scan commands directing the one or more hardware elements included in the distributed computing environment (e.g., distributing computing environment 120) to provide the mapping data.

Figure 2D:
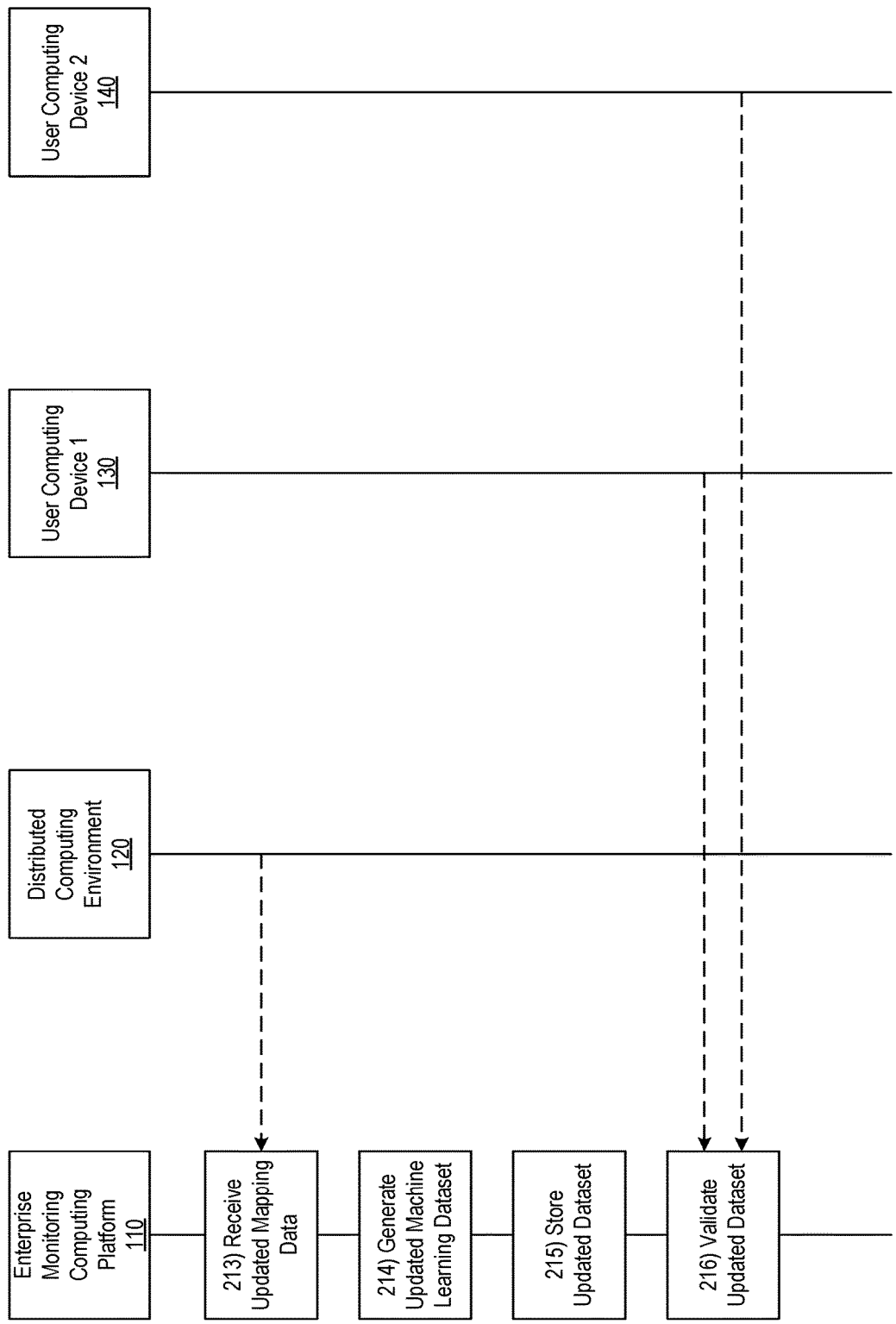

Referring to FIG. 2D, at step 213, enterprise monitoring computing platform 110 may receive updated mapping data from distributing computing environment 120. For example, at step 213, after detecting the environmental modification in the distributed computing environment (e.g., distributing computing environment 120), enterprise monitoring computing platform 110 may receive, via the communication interface (e.g., communication interface 113), updated environment mapping data from the distributed computing environment (e.g., distributing computing environment 120).

At step 214, enterprise monitoring computing platform 110 may generate an updated machine learning dataset based on the updated mapping data. For example, at step 214, enterprise monitoring computing platform 110 may generate an updated machine learning dataset based on the updated environment mapping data received from the distributed computing environment (e.g., distributing computing environment 120). The updated machine learning dataset (which may, e.g., be generated by enterprise monitoring computing platform 110) may, for instance, include information reflecting and/or otherwise identifying the changes in distributing computing environment 120 detected by enterprise monitoring computing platform 110, such as the addition, remove, and/or modification of one or more hardware elements and/or one or more software elements included in distributing computing environment 120. At step 215, enterprise monitoring computing platform 110 may store the updated machine learning dataset.

At step 216, enterprise monitoring computing platform 110 may validate the updated machine learning dataset (e.g., similar to how enterprise monitoring computing platform 110 validated the original machine learning dataset, for instance, based on input received from user computing device 130 and/or user computing device 140). For example, at step 216, enterprise monitoring computing platform 110 may validate the updated machine learning dataset generated based on the updated environment mapping data received from the distributed computing environment (e.g., distributing computing environment 120).

Figure 2E:
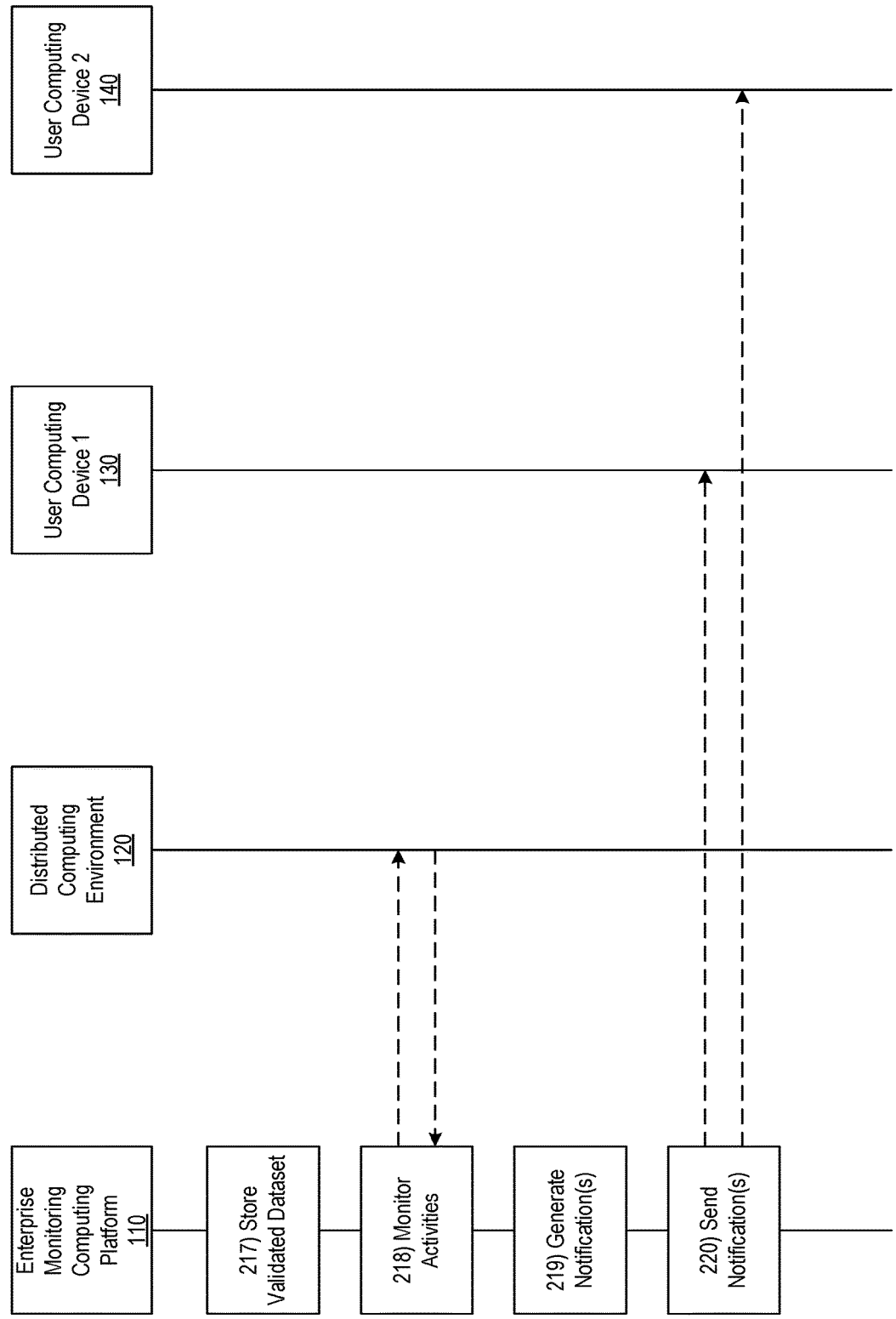

Referring to FIG. 2E, at step 217, enterprise monitoring computing platform 110 may store the validated, updated machine learning dataset. At step 218, enterprise monitoring computing platform 110 may monitor activities in distributing computing environment 120, such as application functions, database functions, API calls, network usage, and/or other activities involving one or more specific hardware elements in distributing computing environment 120 and/or one or more specific software elements in distributing computing environment 120. For example, at step 218, enterprise monitoring computing platform 110 may monitor one or more activities in the distributed computing environment (e.g., distributing computing environment 120).

At step 219, enterprise monitoring computing platform 110 may generate one or more notifications (e.g., based on the activity monitoring). For example, at step 219, based on monitoring the one or more activities in the distributed computing environment (e.g., distributing computing environment 120), enterprise monitoring computing platform 110 may generate at least one activity issue notification.

In some embodiments, the at least one activity issue notification generated based on monitoring the one or more activities in the distributed computing environment may include an indication that a workload level of at least one hardware element included in the distributed computing environment exceeds a predetermined threshold. For example, the at least one activity issue notification (which may, e.g., be generated by enterprise monitoring computing platform 110 based on monitoring the one or more activities in the distributed computing environment (e.g., distributing computing environment 120)) may include an indication that a workload level of at least one hardware element included in the distributed computing environment (e.g., distributing computing environment 120) exceeds a predetermined threshold. Such a predetermined threshold may be specified by a network administrator, such as a user of user computing device 130 and/or user computing device 140, or may be automatically determined by enterprise monitoring computing platform 110 and/or machine learning engine 112*c* based on monitoring and/or observation of distributing computing environment 120 performed by enterprise monitoring computing platform 110 over a period of time.

In some embodiments, the at least one activity issue notification generated based on monitoring the one or more activities in the distributed computing environment may include an indication that a technical issue encountered by at least one hardware element included in the distributed computing environment results from at least one root cause determined by the computing platform based on the updated machine learning dataset. For example, the at least one activity issue notification (which may, e.g., be generated by enterprise monitoring computing platform 110 based on monitoring the one or more activities in the distributed computing environment (e.g., distributing computing environment 120)) may include an indication that a technical issue encountered by at least one hardware element included in the distributed computing environment (e.g., distributing computing environment 120) results from at least one root cause determined by the computing platform (e.g., enterprise monitoring computing platform 110) based on the updated machine learning dataset. Such a root case may, for instance, be determined by enterprise monitoring computing platform 110 and/or machine learning engine 112*c* based on monitoring and/or observation of distributing computing environment 120 performed by enterprise monitoring computing platform 110 over a period of time.

At step 220, enterprise monitoring computing platform 110 may send the one or more notifications generated at step 219 to one or more recipient devices, such as user computing device 130 and/or user computing device 140. For example, at step 220, enterprise monitoring computing platform 110 may send, via the communication interface (e.g., communication interface 113), to at least one user device (e.g., user computing device 130, user computing device 140), the at least one activity issue notification generated based on monitoring the one or more activities in the distributed computing environment (e.g., distributing computing environment 120).

Figure 2F:
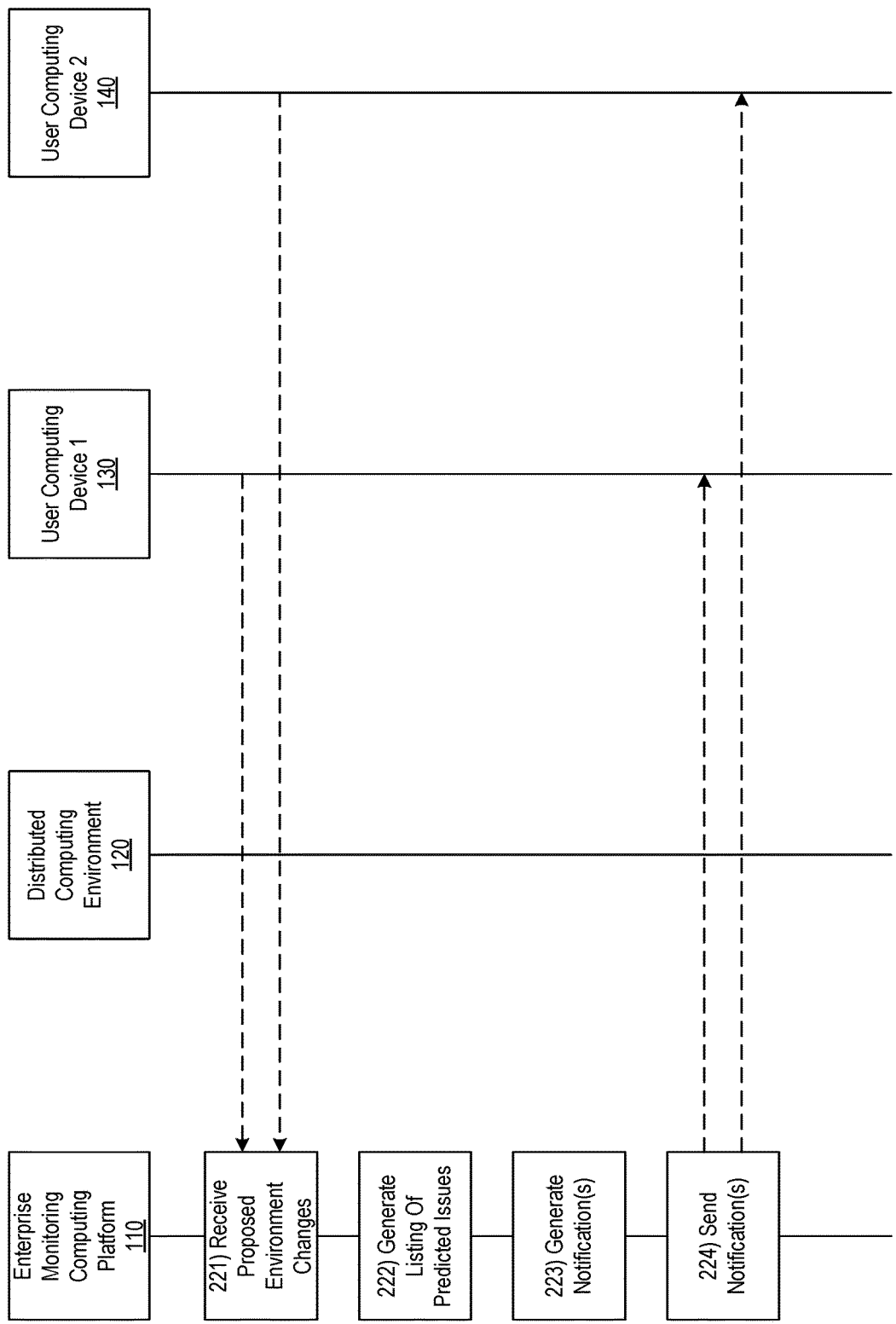

Referring to FIG. 2F, at step 221, enterprise monitoring computing platform 110 may receive information about one or more proposed changes to distributing computing environment 120, such as potential changes to hardware and/or software included in distributing computing environment 120 specified by a network administrator (e.g., a user of user computing device 130 and/or user computing device 140). For example, at step 221, enterprise monitoring computing platform 110 may receive, via the communication interface (e.g., communication interface 113), from at least one user device (e.g., user computing device 130, user computing device 140), information identifying one or more proposed changes to one or more hardware elements included in the distributed computing environment (e.g., distributing computing environment 120) or one or more software elements included in the distributed computing environment (e.g., distributing computing environment 120).

At step 222, enterprise monitoring computing platform 110 may generate a listing of predicted issues (e.g., using machine learning engine 112*c* and/or based on the machine learning dataset(s) maintained by enterprise monitoring computing platform 110). For example, at step 222, in response to receiving the information identifying the one or more proposed changes to the one or more hardware elements included in the distributed computing environment (e.g., distributing computing environment 120) or the one or more software elements included in the distributed computing environment (e.g., distributing computing environment 120), enterprise monitoring computing platform 110 may generate, based on the updated machine learning dataset (which may, e.g., have been generated at step 214 and/or validated at step 216), a listing of one or more predicted issues arising from the one or more proposed changes to the one or more hardware elements included in the distributed computing environment (e.g., distributing computing environment 120) or the one or more software elements included in the distributed computing environment (e.g., distributing computing environment 120). Such predicted issues may, for instance, be determined by enterprise monitoring computing platform 110 and/or machine learning engine 112*c* based on monitoring and/or observation of distributing computing environment 120 performed by enterprise monitoring computing platform 110 over a period of time.

At step 223, enterprise monitoring computing platform 110 may generate one or more notifications (e.g., based on generating the listing of predicted issues). For example, at step 223, enterprise monitoring computing platform 110 may generate a notification for the at least one user device (e.g., user computing device 130, user computing device 140). In addition, the notification (which may, e.g., be generated by enterprise monitoring computing platform 110 at step 223) may include the listing (e.g., generated by enterprise monitoring computing platform 110 at step 222) of the one or more predicted issues arising from the one or more proposed changes to the one or more hardware elements included in the distributed computing environment (e.g., distributing computing environment 120) or the one or more software elements included in the distributed computing environment (e.g., distributing computing environment 120).

At step 224, enterprise monitoring computing platform 110 may send the one or more notifications generated at step 223 to one or more recipient devices. For example, at step 224, enterprise monitoring computing platform 110 may send, via the communication interface (e.g., communication interface 113), to the at least one user device (e.g., user computing device 130, user computing device 140), the notification generated for the at least one user device (e.g., user computing device 130, user computing device 140).

Figure 3:
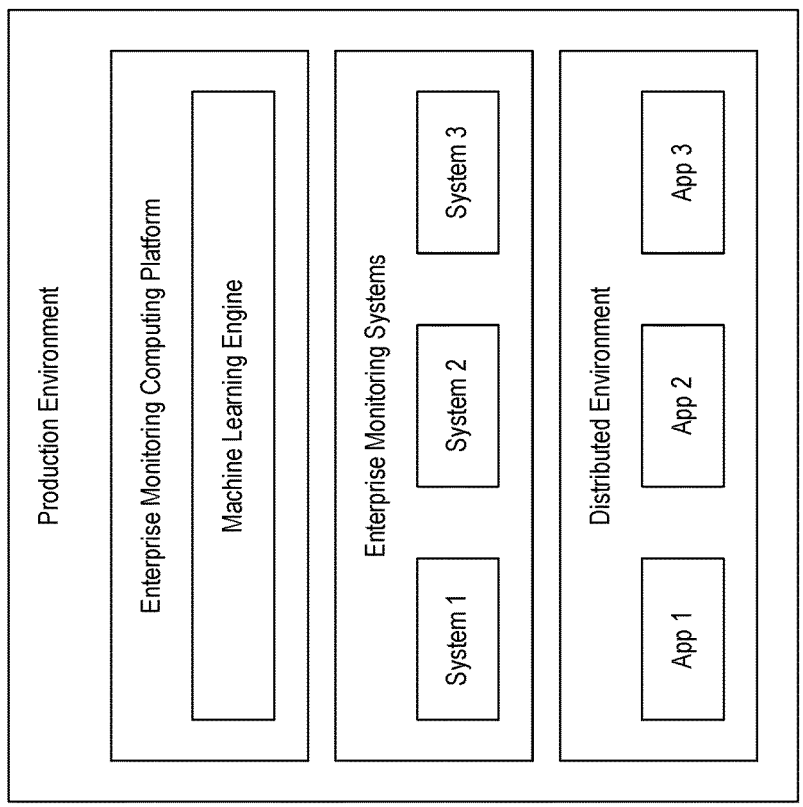
FIGS. 3 and 4 depict example configurations of a data processing system with a machine learning engine that is configured to provide enterprise monitoring functions in accordance with one or more example embodiments.
Figure 4:
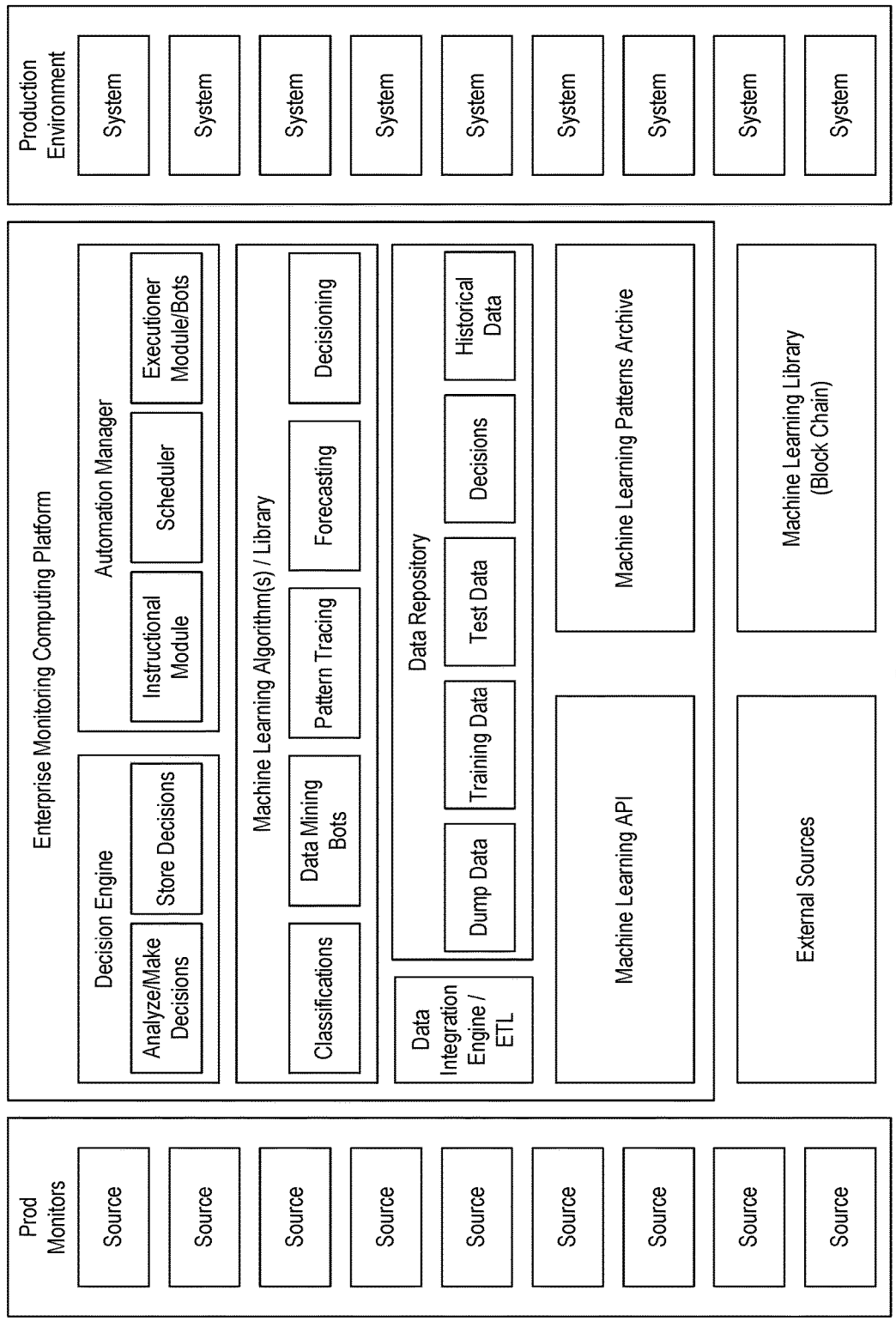

FIGS. 3 and 4 depict example configurations of a data processing system with a machine learning engine that is configured to provide enterprise monitoring functions in accordance with one or more example embodiments. As seen in FIGS. 3 and 4, in one or more arrangements, the enterprise monitoring computing platform (e.g., enterprise monitoring computing platform 110) may provide transaction flow functions. For instance, for a given application error, the enterprise monitoring computing platform (e.g., enterprise monitoring computing platform 110) may dynamically generate an end-to-end transaction flow listing all entities involved in the flow. This listing may, for instance, include servers, JVMs, middleware, network appliances, contact information, and everything in-between. Applications and hardware information may be pulled from other monitoring sources. In addition, bots may be utilized to learn and map out entities relationships (e.g., app to app, and everything in-between).

In some instances, the enterprise monitoring computing platform (e.g., enterprise monitoring computing platform 110) may provide quick scan analysis functions. For instance, the enterprise monitoring computing platform (e.g., enterprise monitoring computing platform 110) may perform end to end error and/or performance tracing based on a given API and/or web service call. By doing so, the enterprise monitoring computing platform (e.g., enterprise monitoring computing platform 110) may later use this knowledge as part of its cognitive awareness to quickly pin point root cause once an incident occurs.

In some instances, the enterprise monitoring computing platform (e.g., enterprise monitoring computing platform 110) may provide time of first occurrence analysis functions. For instance, the enterprise monitoring computing platform (e.g., enterprise monitoring computing platform 110) may also map all errors across the enterprise landscape (e.g., distributing computing environment 120) that are related to a particular incident, and may use the time of first occurrence method to quickly zoom in on possible root-cause.

In some instances, the enterprise monitoring computing platform (e.g., enterprise monitoring computing platform 110) may execute and/or otherwise provide change and/or release bots functions. For instance, the enterprise monitoring computing platform (e.g., enterprise monitoring computing platform 110) may determine a reverse engineered root-cause analysis for monthly releases and other production changes. In some instances, the enterprise monitoring computing platform (e.g., enterprise monitoring computing platform 110) may use its knowledge of the environment and training data from external and internal sources to validate environment and determine potential issues/impacts to all relevant upstream channels. In addition, the enterprise monitoring computing platform (e.g., enterprise monitoring computing platform 110) may initialize validation process from the point of the change and begin backwards tracing analysis. Further, the enterprise monitoring computing platform (e.g., enterprise monitoring computing platform 110) may predict and/or otherwise determine possible errors and/or impacts to upstream channels before and/or after the change has been completed. In some instances, change management may use this information to quickly mitigate impacts to customers. This may be a reliable method deployed throughout an organization using the enterprise monitoring computing platform (e.g., enterprise monitoring computing platform 110).

In some instances, the enterprise monitoring computing platform (e.g., enterprise monitoring computing platform 110) may perform on-demand routing, as the enterprise monitoring computing platform (e.g., enterprise monitoring computing platform 110) may utilize machine learning to understand the big picture (e.g., associated with a particular deployment environment, such as distributing computing environment 120). The enterprise monitoring computing platform (e.g., enterprise monitoring computing platform 110) may have an in-depth and/or real-time end-to-end knowledge of the entire distributed production environment (e.g., distributing computing environment 120), as illustrated above.

Figure 5:
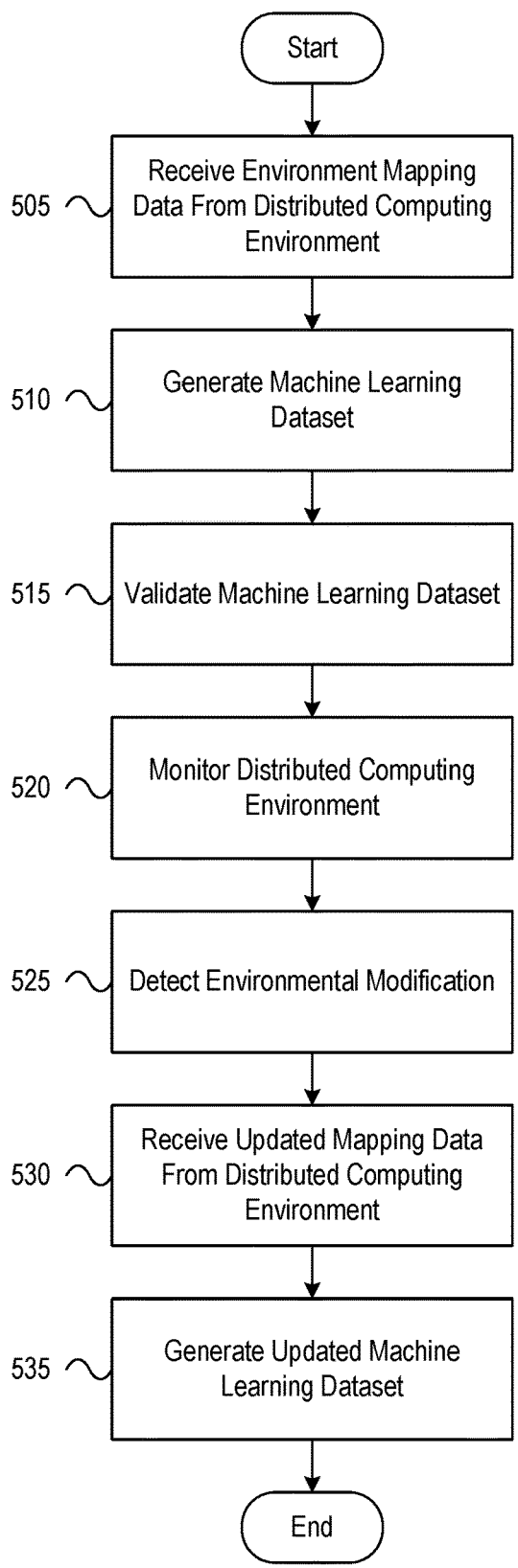
FIG. 5 depicts an illustrative method for implementing and using a data processing system with a machine learning engine to provide enterprise monitoring functions in accordance with one or more example embodiments.

FIG. 5 depicts an illustrative method for implementing and using a data processing system with a machine learning engine to provide enterprise monitoring functions in accordance with one or more example embodiments. Referring to FIG. 5, at step 505, a computing platform having at least one processor, a communication interface, and memory may receive, via the communication interface, environment mapping data from a distributed computing environment. At step 510, the computing platform may generate a machine learning dataset based on the environment mapping data received from the distributed computing environment. At step 515, the computing platform may validate the machine learning dataset generated based on the environment mapping data received from the distributed computing environment. At step 520, the computing platform may monitor the distributed computing environment. At step 525, based on monitoring the distributed computing environment, the computing platform may detect an environmental modification in the distributed computing environment. At step 530, after detecting the environmental modification in the distributed computing environment, the computing platform may receive, via the communication interface, updated environment mapping data from the distributed computing environment. At step 535, the computing platform may generate an updated machine learning dataset based on the updated environment mapping data received from the distributed computing environment.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
at least one processor;
a communication interface communicatively coupled to the at least one processor; and
memory storing computer-readable instructions that, when executed by the at least one processor, cause the computing platform to:
generate one or more environment scan commands directing one or more hardware elements included in a distributed computing environment to provide mapping data;
send, via the communication interface, to the distributed computing environment, the one or more environment scan commands directing the one or more hardware elements included in the distributed computing environment to provide the mapping data;
receive, via the communication interface, environment mapping data from a-the distributed computing environment;
generate a machine learning dataset based on the environment mapping data received from the distributed computing environment;
validate the machine learning dataset generated based on the environment mapping data received from the distributed computing environment;
monitor the distributed computing environment;
based on monitoring the distributed computing environment, detect an environmental modification in the distributed computing environment;
in response to detecting the environmental modification in the distributed computing environment, generate one or more updated environment scan commands directing the one or more hardware elements included in the distributed computing environment to provide updated mapping data;
send, via the communication interface, to the distributed computing environment, the one or more updated environment scan commands directing the one or more hardware elements included in the distributed computing environment to provide the updated mapping data;
after detecting the environmental modification in the distributed computing environment, receive, via the communication interface, updated environment mapping data from the distributed computing environment; and
generate an updated machine learning dataset based on the updated environment mapping data received from the distributed computing environment.

2. The computing platform of claim 1, wherein receiving the environment mapping data from the distributed computing environment comprises receiving a first portion of the environment mapping data from one or more enterprise servers located in at least one data center associated with the distributed computing environment and receiving a second portion of the environment mapping data from one or more cloud servers associated with the distributed computing environment.

3. The computing platform of claim 1, wherein generating the machine learning dataset based on the environment mapping data received from the distributed computing environment comprises identifying one or more servers, switches, and other hardware elements included in the distributed computing environment and identifying one or more applications, libraries, and other software elements included in the distributed computing environment.

4. The computing platform of claim 3, wherein identifying the one or more servers, switches, and other hardware elements included in the distributed computing environment comprises tracking at least one hardware-software transaction flow using one or more trace identifiers.

5. The computing platform of claim 1, wherein detecting the environmental modification in the distributed computing environment comprises detecting one or more new hardware elements in the distributed computing environment.

6. The computing platform of claim 1, wherein detecting the environmental modification in the distributed computing environment comprises detecting one or more new software elements in the distributed computing environment.

7. The computing platform of claim 1, wherein validating the machine learning dataset generated based on the environment mapping data received from the distributed computing environment comprises validating the machine learning dataset based on input received from one or more user computing devices.

8. The computing platform of claim 1, wherein the memory stores additional computer-readable instructions that, when executed by the at least one processor, cause the computing platform to:
validate the updated machine learning dataset generated based on the updated environment mapping data received from the distributed computing environment.

9. The computing platform of claim 1, wherein the memory stores additional computer-readable instructions that, when executed by the at least one processor, cause the computing platform to:
monitor one or more activities in the distributed computing environment;
based on monitoring the one or more activities in the distributed computing environment, generate at least one activity issue notification; and
send, via the communication interface, to at least one user device, the at least one activity issue notification generated based on monitoring the one or more activities in the distributed computing environment.

10. The computing platform of claim 9, wherein the at least one activity issue notification generated based on monitoring the one or more activities in the distributed computing environment comprises an indication that a workload level of at least one hardware element included in the distributed computing environment exceeds a predetermined threshold.

11. The computing platform of claim 9, wherein the at least one activity issue notification generated based on monitoring the one or more activities in the distributed computing environment comprises an indication that a technical issue encountered by at least one hardware element included in the distributed computing environment results from at least one root cause determined by the computing platform based on the updated machine learning dataset.

12. The computing platform of claim 1, wherein the memory stores additional computer-readable instructions that, when executed by the at least one processor, cause the computing platform to:
receive, via the communication interface, from at least one user device, information identifying one or more proposed changes to one or more hardware elements included in the distributed computing environment or one or more software elements included in the distributed computing environment;
in response to receiving the information identifying the one or more proposed changes to the one or more hardware elements included in the distributed computing environment or the one or more software elements included in the distributed computing environment, generate, based on the updated machine learning dataset, a listing of one or more predicted issues arising from the one or more proposed changes to the one or more hardware elements included in the distributed computing environment or the one or more software elements included in the distributed computing environment;

generate a notification for the at least one user device, the notification comprising the listing of the one or more predicted issues arising from the one or more proposed changes to the one or more hardware elements included in the distributed computing environment or the one or more software elements included in the distributed computing environment; and send, via the communication interface, to the at least one user device, the notification generated for the at least one user device.

13. A method, comprising:

at a computing platform comprising at least one processor, memory, and a communication interface:
generating, by the at least one processor, one or more environment scan commands directing one or more hardware elements included in a distributed computing environment to provide mapping data;
sending, by the at least one processor, via the communication interface, to the distributed computing environment, the one or more environment scan commands directing the one or more hardware elements included in the distributed computing environment to provide the mapping data;
receiving, by the at least one processor, via the communication interface, environment mapping data from the distributed computing environment;
generating, by the at least one processor, a machine learning dataset based on the environment mapping data received from the distributed computing environment;
validating, by the at least one processor, the machine learning dataset generated based on the environment mapping data received from the distributed computing environment;
monitoring, by the at least one processor, the distributed computing environment;
based on monitoring the distributed computing environment, detecting, by the at least one processor, an environmental modification in the distributed computing environment;
in response to detecting the environmental modification in the distributed computing environment, generating, by the at least one processor, one or more updated environment scan commands directing the one or more hardware elements included in the distributed computing environment to provide updated mapping data;
sending, by the at least one processor, via the communication interface, to the distributed computing environment, the one or more updated environment scan commands directing the one or more hardware elements included in the distributed computing environment to provide the updated mapping data;
after detecting the environmental modification in the distributed computing environment, receiving, by the at least one processor, via the communication interface, updated environment mapping data from the distributed computing environment; and
generating, by the at least one processor, an updated machine learning dataset based on the updated environment mapping data received from the distributed computing environment.

14. The method of claim 13, wherein receiving the environment mapping data from the distributed computing environment comprises receiving a first portion of the environment mapping data from one or more enterprise servers located in at least one data center associated with the distributed computing environment and receiving a second portion of the environment mapping data from one or more cloud servers associated with the distributed computing environment.

15. The method of claim 13, wherein generating the machine learning dataset based on the environment mapping data received from the distributed computing environment comprises identifying one or more servers, switches, and other hardware elements included in the distributed computing environment and identifying one or more applications, libraries, and other software elements included in the distributed computing environment.

16. The method of claim 15, wherein identifying the one or more servers, switches, and other hardware elements included in the distributed computing environment comprises tracking at least one hardware-software transaction flow using one or more trace identifiers.

17. The method of claim 13, wherein detecting the environmental modification in the distributed computing environment comprises detecting one or more new hardware elements in the distributed computing environment.

18. One or more non-transitory computer-readable media storing instructions that, when executed by a computing platform comprising at least one processor, memory, and a communication interface, cause the computing platform to:
generate one or more environment scan commands directing one or more hardware elements included in a distributed computing environment to provide mapping data;
send, via the communication interface, to the distributed computing environment, the one or more environment scan commands directing the one or more hardware elements included in the distributed computing environment to provide the mapping data;
receive, via the communication interface, environment mapping data from the distributed computing environment;
generate a machine learning dataset based on the environment mapping data received from the distributed computing environment;
validate the machine learning dataset generated based on the environment mapping data received from the distributed computing environment;
monitor the distributed computing environment;
based on monitoring the distributed computing environment, detect an environmental modification in the distributed computing environment;
in response to detecting the environmental modification in the distributed computing environment, generate one or more updated environment scan commands directing the one or more hardware elements included in the distributed computing environment to provide updated mapping data;
send, via the communication interface, to the distributed computing environment, the one or more updated environment scan commands directing the one or more hardware elements included in the distributed computing environment to provide the updated mapping data;

after detecting the environmental modification in the distributed computing environment, receive, via the communication interface, updated environment mapping data from the distributed computing environment; and generate an updated machine learning dataset based on the updated environment mapping data received from the distributed computing environment.

\* \* \* \* \*